(12) United States Patent
Grow et al.

(10) Patent No.: US 7,580,220 B1
(45) Date of Patent: Aug. 25, 2009

(54) CARTRIDGE MAGAZINE WITH PIVOTING CARTRIDGE RETENTION MECHANISM

(75) Inventors: Roger H. Grow, Lafayette, CO (US); Kenneth Lee Manes, Brighton, CO (US); Dan Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 515 days.

(21) Appl. No.: 11/183,620

(22) Filed: Jul. 18, 2005

(51) Int. Cl.
*G11B 15/68* (2006.01)
*G11B 33/04* (2006.01)
(52) U.S. Cl. ...................................... 360/92.1
(58) Field of Classification Search ............... 360/92, 360/92.1
See application file for complete search history.

(56) References Cited

U.S. PATENT DOCUMENTS

| | | | |
|---|---|---|---|
| 5,021,902 A * | 6/1991 | Ishikawa et al. | 360/92.1 |
| 5,442,500 A * | 8/1995 | Hidano et al. | 360/92.1 |
| 5,532,888 A * | 7/1996 | Acosta et al. | 360/92.1 |
| 5,936,795 A * | 8/1999 | Theobald et al. | 360/92.1 |
| 6,259,578 B1 * | 7/2001 | Christiansen et al. | 360/92.1 |

* cited by examiner

*Primary Examiner*—Craig A. Renner
(74) *Attorney, Agent, or Firm*—Brooks Kushman P.C.

(57) ABSTRACT

A cartridge magazine is shown for placement in a robotic media library. The magazine body has two walls to guide a tape cartridge into a final stopping position. A prong extends into the cartridge from a first wall and an opening is formed in the second wall to permit a friction pad to contact an opposing side of the cartridge. The friction pad is mounted onto a lever that rotates upon a pivot outside a cartridge chamber on the magazine body. The lever is pushed by a spring to ordinarily extend the friction pad well into vacant cartridge chambers. An operator pad of the lever may extend out of the magazine body for engagement by an operator or by door pressures to retract the friction pad so that the cartridge becomes either disengaged, or slightly engaged with the friction pad.

15 Claims, 6 Drawing Sheets

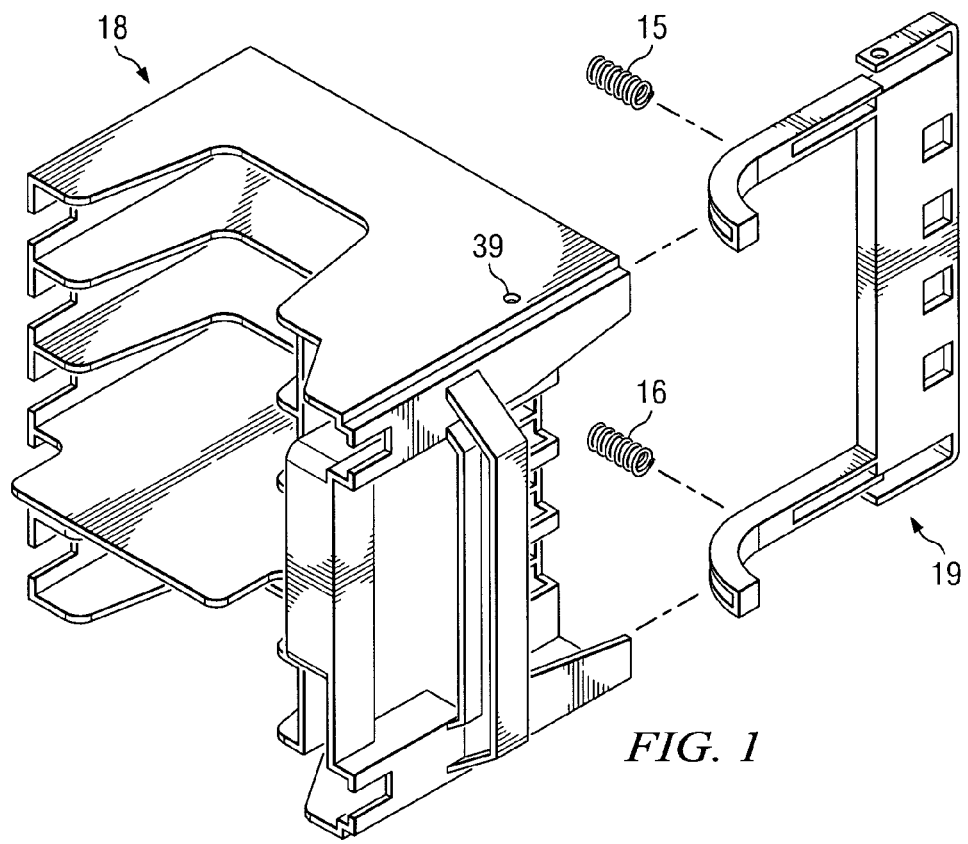
FIG. 1
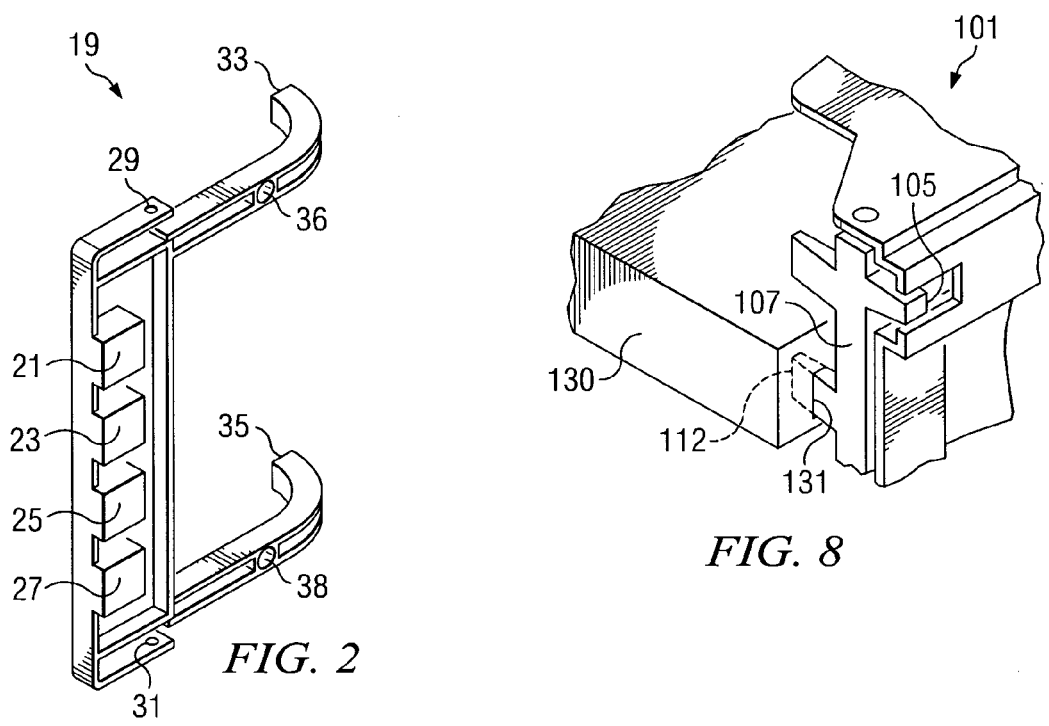
FIG. 2
FIG. 8

CARTRIDGE MAGAZINE WITH PIVOTING CARTRIDGE RETENTION MECHANISM

BACKGROUND OF THE INVENTION

1. Field of the Invention

The present invention generally relates to transport and securing of physical media and use of a door to interoperate with securing physical media, and more specifically to engaging and disengaging a tape cartridge into a tape cartridge magazine.

2. Description of the Related Art

Robotic media storage libraries are devices for providing automated access to a large collection of data stored on multiple physical storage media, such as magnetic tape cartridges or compact discs. One type of robotic media storage library is a tape media storage library. Generally, such libraries have a robot arm situated centrally within a cabinet, and racks of shelves for tapes arranged around the periphery of the cabinet. A cabinet may have space where a magazine of one or more tapes may be placed facing the robot. Such is the configuration of the StreamLine™ SL500 modular library system manufactured by Storage Technology Corporation, generally known as a 'library'.

A typical tape cartridge is a box-shaped, typically plastic case having dimensions on the same order as a video cassette recorder tape. Like a video cassette recorder tape, rough handling, such as dropping from three feet onto a concrete floor, can jeopardize data integrity.

Magazines exist to permit easy movement of multiple cartridges at one time, and permit easy placement of the cartridges within a library cabinet. One of the features of the magazines in the SL500 system is that the magazines position the cartridges for easy access by the internal robot, while keeping the robot mechanism away from the hands and clothing of technicians handling the magazine.

In addition, for each chamber of the magazine arranged to receive a cartridge, a latching prong fits within a detent of a fully inserted cartridge. The friction of the detent is able to keep the cartridge in place during normal handling of the magazine, however, an inverted, or roughly handled magazine remains susceptible to releasing the cartridge onto whatever object lays below, often the hard surface of a floor.

Nevertheless, a moderate or light force to retain the cartridge is all that is allowable. A tighter grip is possible, but correspondingly increases the risk that repeated grips of the cartridge will wear down and crush the cartridge. Thus, a robot within the cabinet is configured to have a limited grip.

Generally, a technician having a cartridge to add performs a four-step process to load the cartridge into a SL500 library. First, the technician adds a cartridge to an available open slot of a magazine. Second, the technician opens a hinged door to the cabinet of the SL500 library. Third, the technician slides the magazine into place within the doorway. Fourth, the technician closes the door.

In addition to the risk of fully releasing a cartridge onto the floor, when a technician places the magazine within the cabinet, a cartridge unintentionally may extend partially from the magazine chamber. An inadequately seated or engaged cartridge may thus extend into the path of a moving robot, wherein the robot damages itself or the cartridge.

In view of the foregoing, there exists a need to capture or firmly engage a cartridge within a magazine while being handled by a technician. There exists a need to release the cartridge so that a robot may grasp and extract the cartridge for storage and other functions of the library. In addition, there exists a need to allow a technician to release engagement so that the technician can load and empty the magazine.

SUMMARY OF THE INVENTION

The present invention provides an apparatus, for loading or storing at least one storage element, for example, a cartridge in a cartridge magazine. The magazine may have a body having shelves, each having a first wall and a second wall parallel to the first wall such that the walls define a chamber. A pivot mount may extend from the body outside the walls. An aperture in the walls may admit an engagement member. The engagement member may be spring-loaded to push a portion of the engagement member into the chamber—and yet retractable if a technician releases an operator pad to remove the engagement member from the chamber.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

FIG. 1 is an exploded perspective view in accordance with an illustrative embodiment of the present invention;

FIG. 2 is a reverse perspective view of a lever in accordance with an illustrative embodiment of the present invention;

FIG. 8 is a detailed view of a lever in engagement with a cartridge slot in accordance with a second illustrative embodiment of the present invention.

DETAILED DESCRIPTION OF THE PREFERRED EMBODIMENT

Figure 3A:
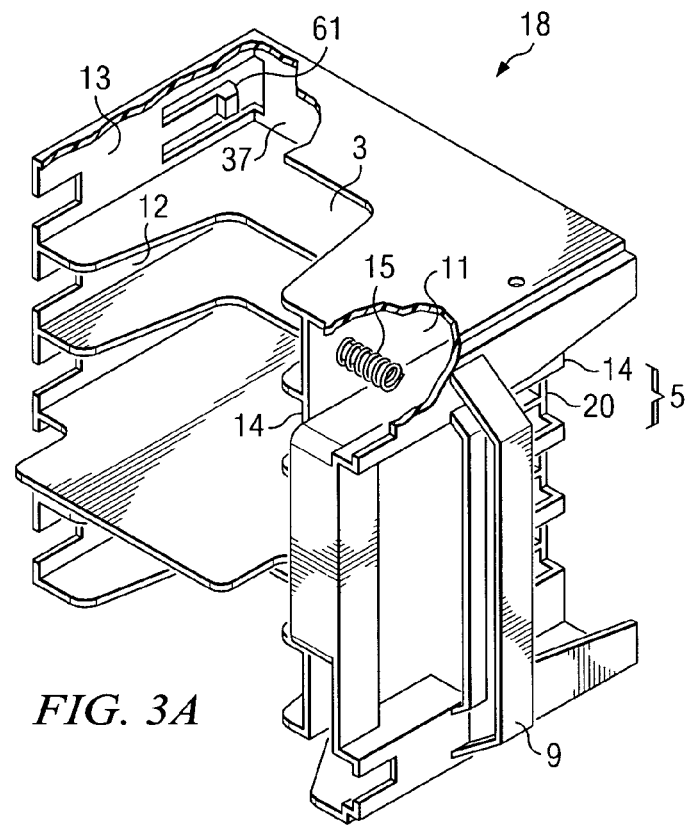
FIG. 3A is a perspective view of a cartridge magazine in accordance with an illustrative embodiment of the present invention.

FIG. 1 shows an exploded diagram in accordance with an illustrative embodiment of the invention. Cartridge magazine body 18 accommodates five storage elements oriented, in normal operation, horizontally. The storage elements may have a width which may correspond to a width of a chamber of the cartridge magazine body 18. To provide ease of orienting a storage element, the storage elements may have parallel sides wherein a substantial portion of the storage element is a width common to the width of the chamber. Such parallel sides may provide more options for engaging the storage element for more rigid transport within a cartridge magazine body 18. A frequently used storage element is the tape cartridge. Tape cartridges may be generally rectilinear, having squared off corners, and may house industry standard tape spools. Cartridge magazine body 18 may have a retention member that may come into direct contact with a storage element to prevent unwanted jostling of the storage element. A retention member may, without forces external to a cartridge magazine, capture a tape cartridge or other storage element so as to halt unwanted travel of the tape cartridge during transport or rough handling. A retention member mounts to a cartridge magazine body so that absent the external force, the retention member is movable with respect to the cartridge magazine body. Absent the external force, the retention member may be in a travel inhibit position, for example, the retention member may extend into a chamber of the cartridge magazine or at least extend beyond a threshold for admitting a cartridge into a cartridge magazine. Generally, a retention member has a facility to retract beyond the travel inhibit position. A retraction may be such that the retention member, when operated by an operator pad, retracts from a chamber or is pulled from cartridge's path of travel near the threshold of a chamber. A retention member will have a portion disposed outside the chamber operable to retract the retention member from the chamber. One example of a retention member is an engagement member, which may apply a lateral pressure on a cartridge that, combined with friction, resists transport forces to keep a cartridge relatively secure.

Among the ways to prevent unwanted jostling is to provide friction between an engagement member and a storage element. Consequently, an engagement member may be lever 19 having one or more friction pads. Lever 19 may be assembled to operate chiefly outside the five chambers or slots within which tape cartridges may be installed. The operation of first spring member 15 and second spring member 16 may exert a force outwardly from cartridge magazine body 18 to permit a portion of the assembled lever to be readily accessible to, for example, a thumb near a handle of cartridge magazine body 18.

A retention member, in this case lever 19, is movable with respect to cartridge magazine body 18. Pivot mount 39 may hold lever 19 in rotational engagement with cartridge magazine body 18. Pivot mount 39 may operate to translate the bias or outward force of spring members 15 and 16 to a bias or inward force, extending a portion of lever 19 into or at least towards a chamber.

FIG. 2 shows a reverse view of lever 19 first depicted in FIG. 1. Lever 19 has four friction pads 21, 23, 25, and 27. Friction pads may have a high co-efficient of friction or otherwise be textured to provide high resistance to sliding movement of a cartridge that may rest against the friction pads. A friction pad need not rely on friction alone to impede or defeat a sliding cartridge. A friction pad may have one or more protrusions that may fit within a reciprocal indentation, if any, of a cartridge. Lever 19 has first operator pad 33 and second operator pad 35. Capture points 36 and 38 may provide a trap to fix the end of one or more spring members in engagement with lever 19.

Lever 19 has a pivot axis that extends between pivot point 29 and pivot point 31 about which lever 19 may rotate. Pivot point 29 may engage with pivot mount 39 to confine lever 19 to rotate under most forces typical of the operating environment of the cartridge magazine. Pivot point 31 may engage with another pivot mount of the cartridge magazine body 18. Pivot point 29 may be a protrusion that extends into pivot mount 39. Alternatively, pivot mount 39 may be a protrusion that extends into pivot point 29. In either configuration, pivot point 29 and pivot mount 39 cooperate to allow rotating movement between the respective parts. Similarly, pivot point 31 may protrude so as to cooperate with the pivot mount located opposite pivot mount 39, but hidden at the bottom side of FIG. 1.

FIG. 3A is a perspective view of cartridge magazine body 18 having two cutaways to show parts ordinarily not visible from the perspective. The lever is not shown for simplicity. A technician may place a cartridge horizontally upon shelf 3 to snuggly fit within a chamber defined or bounded by first short wall 13 and second short wall 11. First short wall 13 and second short wall 11 may be substantially parallel, so as to encourage sliding travel of a cartridge, and to limit the cartridge rotating away from an optimal orientation. Having short walls parallel to each other may reduce the opportunities for a cartridge to pinch or wedge between the walls. A cartridge may have a corner indentation or detent that may cooperate with prong 61 to provide resistance to a person or robot to extracting a fully inserted cartridge. Prong 61 may be made of a durable plastic or other material that is stiff with slight elasticity.

Second short wall 11 has a surface facing the chamber. The direction of facing is inward, and directions in relation from the second short wall toward a cartridge or chamber is considered inside. The short wall has a surface facing away from the chamber, which is considered outside. Directions from the surface away from the chamber are considered outside or outward. Spring member 15 may be a spring, for example a helical spring. Spring member 15 may extend from the outside facing surface of second short wall 11. Second short wall 11 may support a handle 9 of sufficient size to admit human fingers between handle 9 and second short wall 11.

Third short wall 12 may be present below first short wall 13. Fourth short wall 14 may be present below second short wall 11. Fourth short wall 14 may have an opening 5 that is extended by lip 20 formed, in part, from the backside 37. Opening 5 may admit friction pad 23 of FIG. 2 to pass through. Friction pad 23 may extend into one or more chambers. When extended into a chamber, a friction pad may offer a surface that is not parallel to second short wall 11. In other words, friction pad 23 may be at a slight angle from the surface of second short wall 11. This may cause the distance between friction pad 23 and third short wall 12 to be less than a cartridge width. Thus, a cartridge placed in a chamber may wedge between a friction pad, such as friction pad 23, and other parts to reduce shifting during transport. Additional short walls and openings may be present in the cartridge magazine body 18.

Backside 37 may extend along the back, attached to shelf 3. Backside 37 may be attached to first short wall 13 and second short wall 11. Multiple openings capable of admitting friction pads may be formed, in part, by backside 37. Backside 37 may block movement in a longitudinal direction of one or more cartridges resting on one or more shelves. The direction perpendicular to backside 37 is longitudinal. Directions that parallel backside 37 are transverse.

Figure 3B:
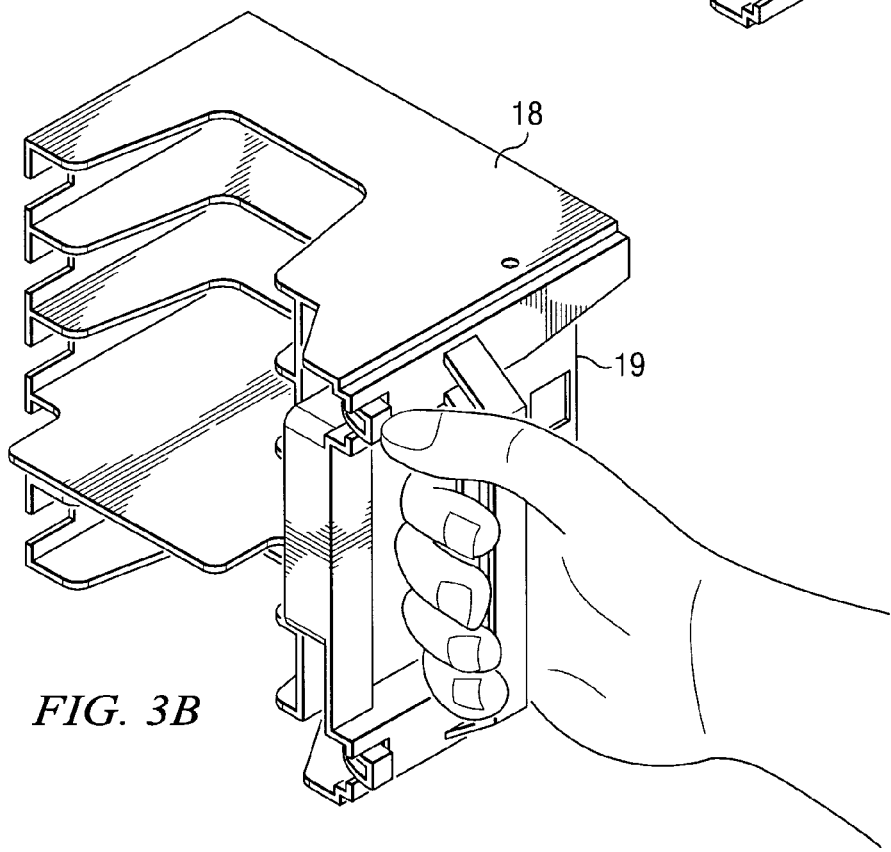
FIG. 3B is a perspective view of an assembled cartridge magazine in accordance with an illustrative embodiment of the invention.

FIG. 3B shows a perspective view of assembled cartridge magazine body 18, lever 19 and an operator grasping the handle of cartridge magazine body 18.

Figure 4A:
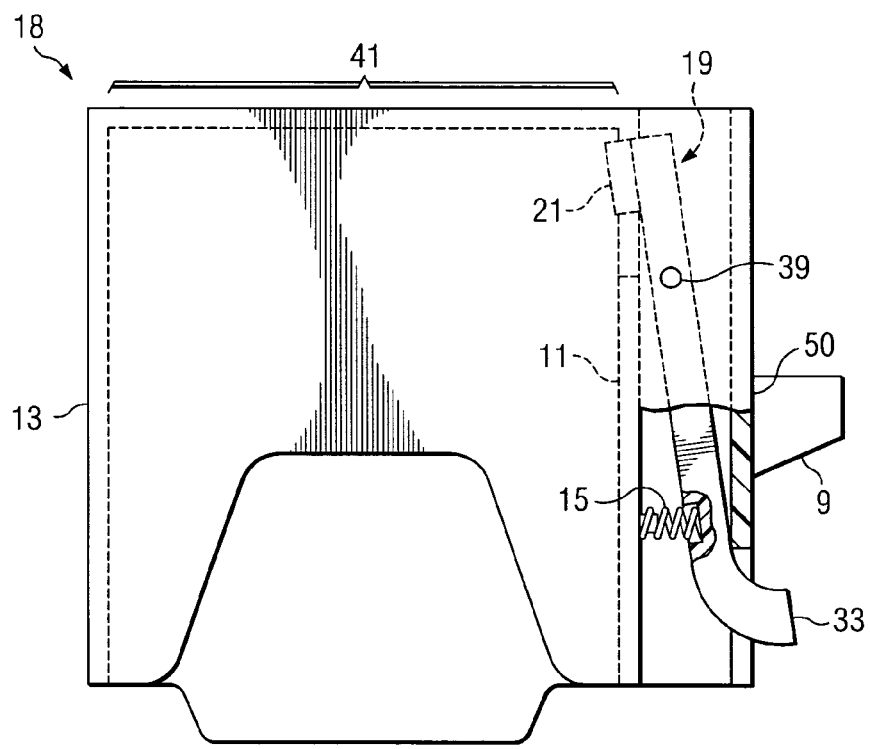
FIG. 4A is a top view of a cartridge magazine in accordance with an illustrative embodiment of the present invention.

FIG. 4A shows a top view of assembled cartridge magazine body 18, and lever 19. A nub on second short wall 11 may secure spring member 15. One or more chambers 41 are defined by first short wall 13 and second short wall 11. Pivot mount 39 may admit a vertical nub to guide lever 19 in rotational or pivotal cooperation with cartridge magazine body 18. Cartridge magazine body 18, at rest, without a cartridge inserted, may permit friction pad 21 to extend within chamber 41. Operator pad 33 may extend through cartridge magazine body 18 to allow engagement with a human hand or a cabinet door to a tape library. Handle 9 may admit fingers so that a technician may lift the magazine and place the magazine within a cabinet. Handle 9 may attach to cartridge magazine body 18 at joint 50. Placement of first operator pad 33 may allow a technician's right hand thumb to be oriented to apply pressure when right hand fingers grasp handle 9. First operator pad 33 may be substantially longitudinally displaced from joint 50.

Figure 4B:
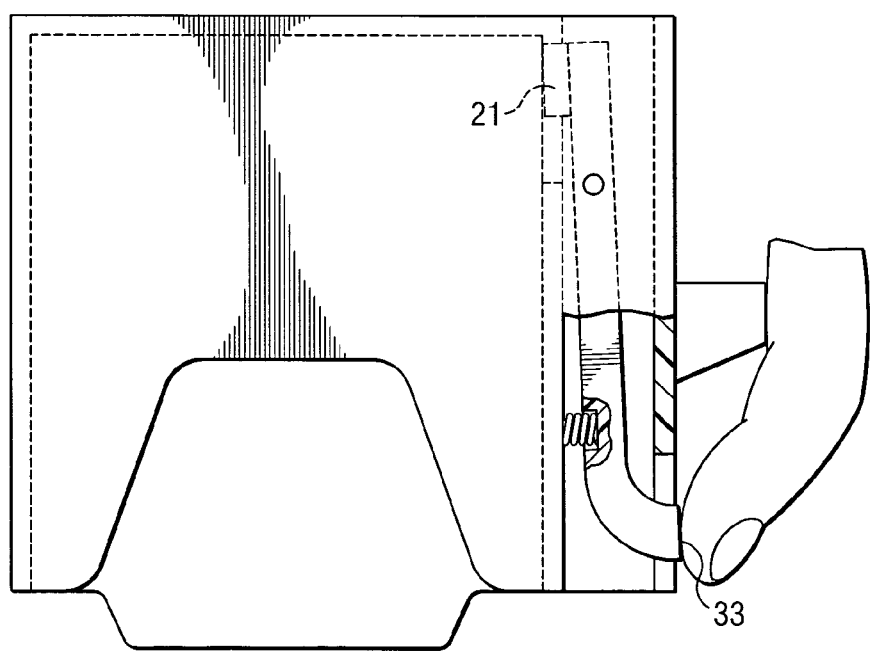
FIG. 4B is a top view of a cartridge magazine with a lever retracted in accordance with an illustrative embodiment of the present invention.

FIG. 4B shows a top view of assembled cartridge magazine body, lever and human thumb. Human thumb exerts a force compressing a spring member and retracting friction pad 21 from the chamber. The thumb may most directly engage first operator pad 33.

Figure 4C:
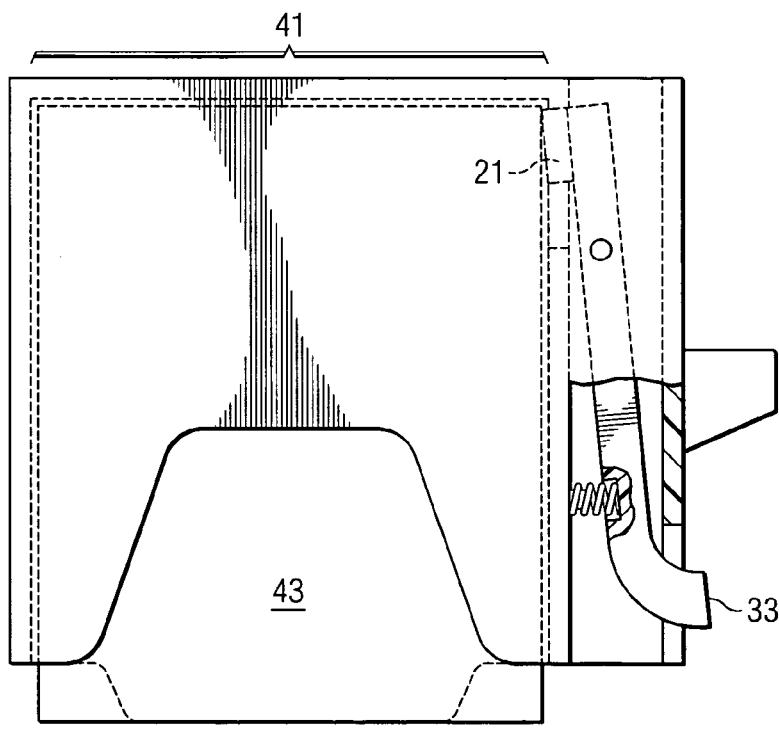
FIG. 4C is a top view of a cartridge magazine with a cartridge inserted in accordance with an illustrative embodiment of the present invention.

FIG. 4C shows a top view of assembled cartridge magazine body, lever and cartridge. A technician may fully insert cartridge 43 and engage cartridge 43 with friction pad 21 to push the lever out, in whole or in part, of chamber 41. Operator pad 33 may be partly displaced from its resting position. When inserted in the library, pressure from a cabinet door may press inward with sufficient pressure on operator pad 33 to more fully displace operator pad 33 and retract friction pad 21 from engagement with cartridge 43. Inward pressure on operator pad 33 may ease cartridge removal and insertion by the robot.

Figure 5:
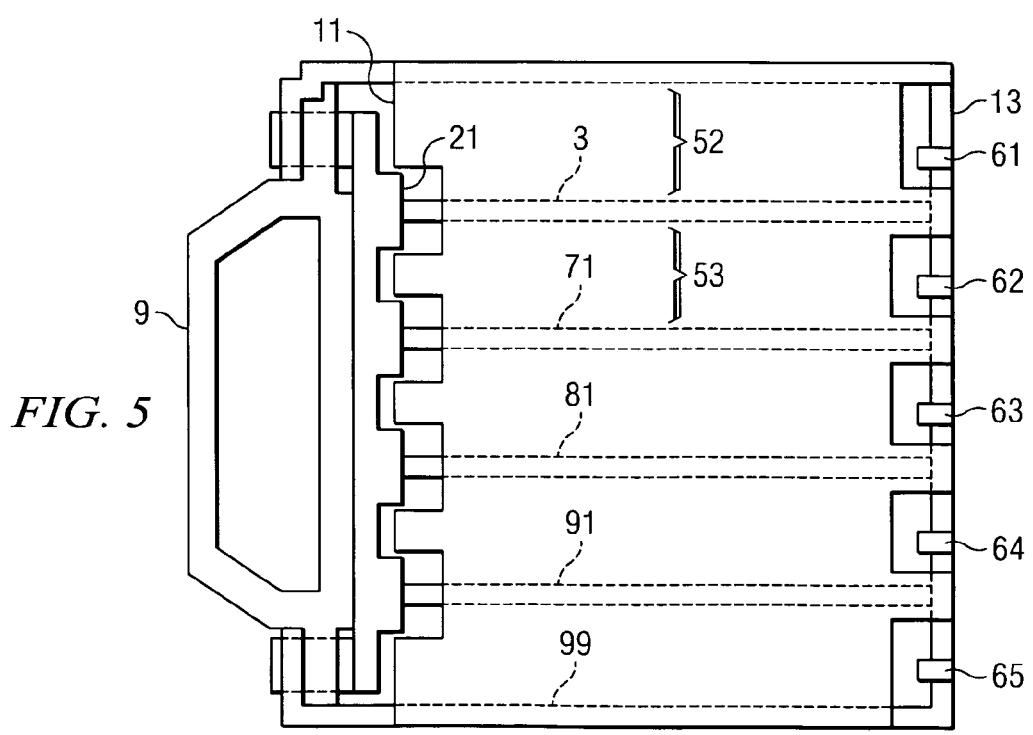
FIG. 5 is a rear view of a cartridge magazine in accordance with an illustrative embodiment of the present invention.

FIG. 5 shows a view of the back of an assembled cartridge magazine body and lever. A prong may extend into each of five chambers. For example, prong 61 extends into chamber 52. Prongs 62, 63, 64, and 65, may each extend into on of the remaining chambers. Chamber 52 is defined by first short wall 13 and second short wall 11 which are located a cartridge width or greater from each other. Shelf 3 may support a cartridge pushed into chamber 52. Additional shelves 71, 81, 91 and 99 may provide support for additional cartridges in additional chambers. Shelf 71 may be a cartridge height or greater distant from shelf 3. Friction pad 21 may extend into chamber 52, and chamber 53. Handle 9 may extend outward from the second short wall 11.

Operation of the assembled cartridge magazine body and lever may be as follows. Cartridge magazine may be in several different orientations, however, it may be best to load one or more cartridges with the cartridge magazine having shelves in a horizontal position. Pressure from one or more springs may be sufficiently low that a first cartridge may be pushed fully into a chamber with ordinary hand force while a friction pad extends into the chamber. One or more friction pads may extend inward to force the detent or indentation of a cartridge more firmly in engagement with a prong on the first short wall.

Additional cartridges may be added to remaining open chambers. A technician may transport the cartridge magazine by lifting the handle so that cartridges are generally vertical. Removal of a cartridge may be by grasping a cartridge and pulling with ordinary hand force. If the technician engaged the cartridge too firmly with friction pad and prong, hand pressure on the operator pad may release the cartridge from engagement with one or more friction pads. This release is done by applying pressure inward on the operator pad to compress the spring member and move the lever into the retracted position. As such, the lever retracts upon application of a force toward the chamber. That is, the lever is retractable.

Figure 6:
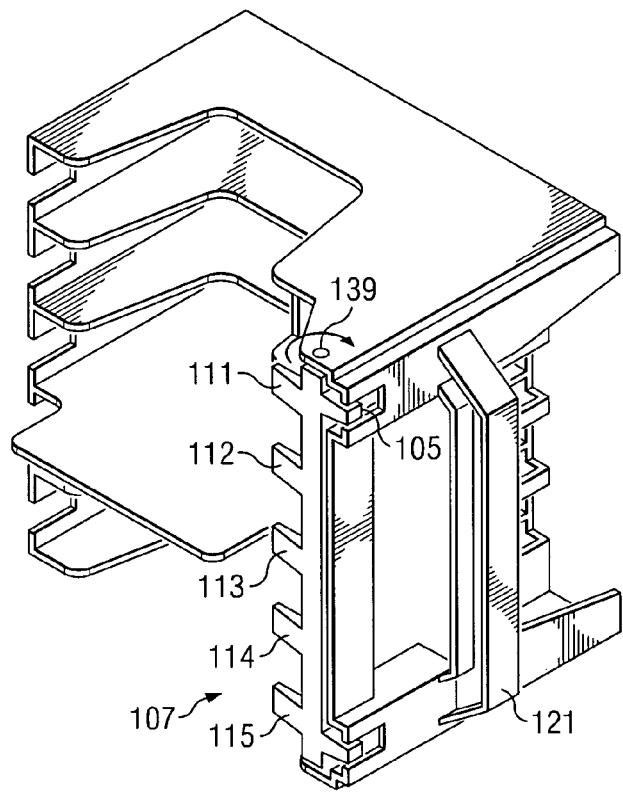
FIG. 6 is a perspective view of an assembled cartridge magazine in accordance with a second illustrative embodiment of the present invention.

FIG. 6 is a perspective view of an assembled cartridge magazine in accordance with a second illustrative embodiment of the present invention. Lever 107 may rotate about pivot mount 139. Lever 107 is in a captured position which holds one or more cartridges with increased resistance. A technician retracts or releases cartridges by rotating lever 107 in a clockwise motion, as shown by the arrow in FIG. 6. In order to rotate, a technician's thumb or other pressure may push operator pad 105 away from handle 121 so that teeth 111, 112, 113, 114, and 115 move away from respective cartridges. The movement may be in relation to cartridges that may be in one or more chambers. Teeth 111-115 may be a type of friction pad.

Figure 7:
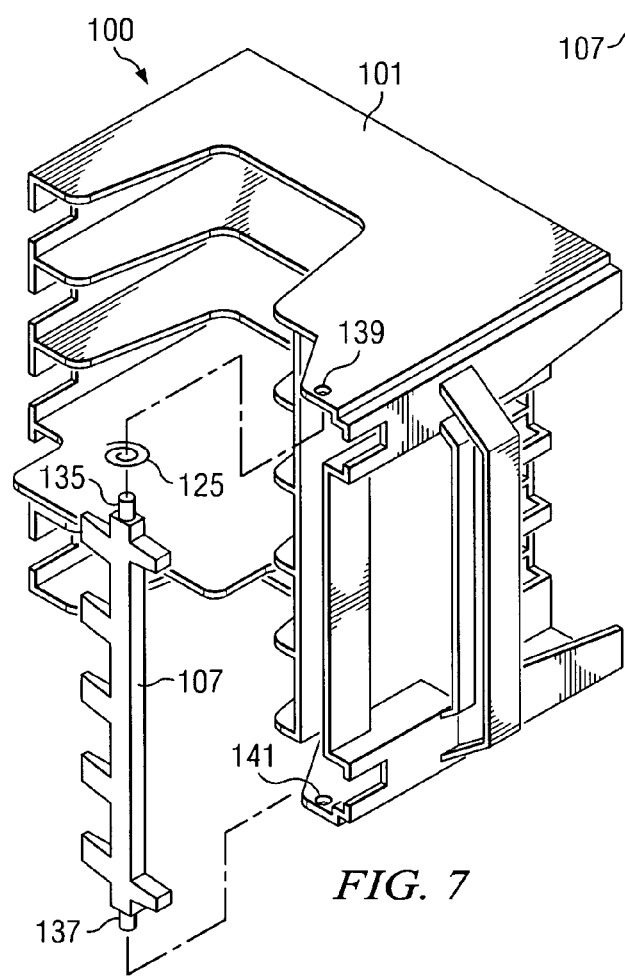
FIG. 7 is an exploded perspective view of an assembled cartridge magazine in accordance with a second illustrative embodiment of the present invention.

FIG. 7 is an exploded perspective view of assembled cartridge magazine 100 in accordance with a second illustrative embodiment of the present invention. Magazine body 101 may have first pivot point 139 and second pivot point 141, which may accommodate at least one spring member 125, which may be a coil spring, for example. An engagement member may be attached near openings or thresholds of several chambers to control entry and removal of one or more storage elements. One form of engagement member may be lever 107. One form of storage element is a cartridge. Assembly of lever 107 is generally between the pivot points such that spring member 125 biases the lever in a counter-clockwise fashion.

A first pin 135 may fit into first pivot hole 139. A second pin 137 may fit into second pivot hole 141. Each pin may be in rotational engagement with a respective pivot hole such that lever 107 is in a pivotal relationship with magazine body 101.

FIG. 8 is a detailed view of a lever in engagement with a cartridge slot in accordance with a second illustrative embodiment of the invention. Cartridge 130 has slot 131 located on a side near a corner. The ordinary orientation and placement of slot 131 places the slot in proximity to tooth 112 of lever 107. Allowing a spring member to rotate lever 107 to a full counter-clockwise range of motion may put tooth 112 into slot 131. In this position, a force to remove cartridge 130 may be unable to remove cartridge for the reason that tooth 112 blocks longitudinal travel. That is counterclockwise motion of operator pad 105 may be stopped by contact with the cartridge magazine body 101. Pressure inward and away from the handle on operator pad 105 may cause lever 107 to rotate clockwise and free cartridge 130 from lever 107.

Figure 9:
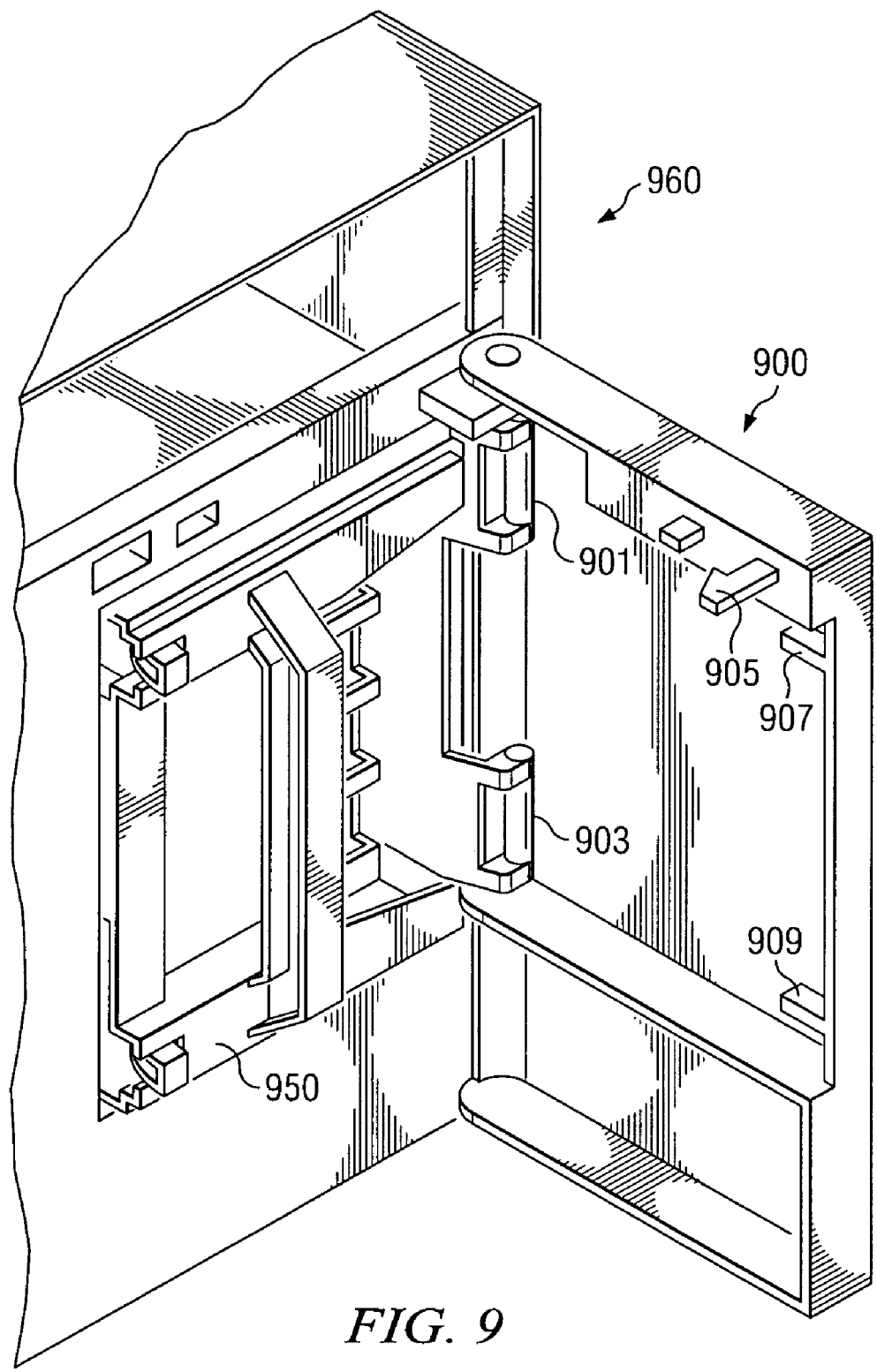
FIG. 9 is a view showing a cabinet door cooperating with a cartridge magazine in accordance with an illustrative embodiment of the present invention.

FIG. 9 shows how a cartridge magazine may cooperate with a cabinet door to retract the lever shown in the illustrative embodiments of the present invention. Retraction of the friction pads may occur inside tape media storage library or cabinet 960 through the operation of closing library cabinet door 900. Cabinet door 900 may be mounted to cabinet such that the door may be opened or closed. For example, the mounting mechanism or mount may be such that door 900 rotates about first hinge 901 and second hinge 903. Upon closure, latch 905 may fasten door 900 in a closed position. The door interoperates with a cartridge magazine provided a technician has placed the magazine inside the cabinet with one or more operator pads near the plane of the threshold or doorway of the cabinet. When the technician closes cabinet door 900, the first lever engager 907 and the second lever engager 909 contact the operator pads of cartridge magazine 950. The pressure of one or more lever engagers causes the lever to retract from the cartridge chambers or otherwise reduce the frictional forces of the friction pads such that a modest pulling force of the robot may remove and replace one or more cartridges. Cartridge magazine 950 may be, for example, cartridge magazine 100 of FIG. 7, or cartridge magazine 18 of FIG. 3A. Operator pads may be, for example, operator pad 33, and operator pad 35 of FIGS. 2 and 3B.

Thus, is how cartridges are secured for transport and installation into a tape library. In addition, a manner that tape cartridges may be released from clamping engagement with a magazine is shown. Data may be more safely moved from occasional use in a tape library, to archival storage, for example, off site.

It is appreciated that an embodiment may be made with fewer or more chambers than five. The friction pads may number fewer or more than four. A spring member may be an elastomeric material forged of the same material as a lever or cartridge magazine body, or any other material that returns to an original shape after being compressed or bent. A prong may be a rigid extension tangential from a short wall, and it may, optionally rest upon a flexible flat extension that permits travel of a portion of the prong tangentially in relation to the short wall. It is appreciated that a door may mount via one or more tracks for sliding movement as well. Short walls may be walls and have any number of holes or other openings in them.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A cartridge magazine for storing at least one cartridge comprising:
   a body having at least one shelf, a first wall and a second wall parallel to the first wall, the first wall positioned a selected width from the second wall that is sufficient to accommodate a cartridge, the second wall including a surface defining an opening, the first wall, second wall, and at least one shelf defining a chamber for the cartridge;
   a retention member movable with respect to the body operating such that the retention member extends a first portion through to a travel inhibit position, the retention member having a portion disposed outside the chamber operable to retract the first portion from the travel inhibit position; and
   a pivot point extending from the body and disposed outside the chamber, the first portion including a friction pad, the retention member comprising a lever rotatable mounted to the pivot point and having a spring member operating in which the lever extends the friction pad through the opening such that the portion disposed outside the chamber is operable to retract the friction pad from the opening.

2. The cartridge magazine of claim 1 further comprising:
   a handle connected by at least one joint to the second wall wherein the joint is substantially longitudinally displaced from the portion disposed outside the chamber.

3. The cartridge magazine of claim 1 further comprising:
   a third wall extending from the body, the third wall substantially longitudinal;
   a fourth wall extending from the body, the fourth wall parallel to the third wall, a cartridge width from the third wall, wherein the third wall and the fourth wall define a second chamber and the opening in the body is formed, in part, by the fourth wall such that the friction pad may extend through the opening into the second chamber.

4. The cartridge magazine of claim 3 further comprising:
   a first prong extending from the first wall; and
   a second prong extending from the third wall.

5. The cartridge magazine of claim 1 further comprising:
   a prong extending from the first wall.

6. The cartridge magazine of claim 1, wherein the spring member is a helical spring.

7. A cartridge magazine for storing at least one cartridge comprising:
   a body having a first wall and a second wall substantially parallel to the first wall, the first wall and the second wall defining a chamber for the cartridge;
   a pivot point attached to the body near the second wall and disposed outside the chamber;
   a lever biased to rotate about the pivot point, the lever having a friction pad biased to extend through an opening in the second wall, an operator pad extending from the body, and a spring member extending from the lever to the second wall.

8. The cartridge magazine of claim 7 further comprising:
   a prong extending from the first wall.

9. The cartridge magazine of claim 8, wherein the prong is biased toward the chamber.

10. The cartridge magazine of claim 7, wherein the spring member comprises a spring.

11. The cartridge magazine of claim 7 further comprising a third wall extending from the body and a fourth wall substantially parallel to the third wall, the third wall and the fourth wall defining a second chamber, wherein the friction pad is biased to extend into the chamber and the second chamber.

12. The cartridge magazine of claim 7, wherein a backside extends from the first wall to the second wall and the opening is near the backside, wherein the backside substantially blocks movement of a cartridge through the chamber beyond the backside.

13. The cartridge magazine of claim 12 wherein the friction pad presents a surface at a slight angle from the second wall such that a portion of the surface is less than a cartridge width from the first wall.

14. The cartridge magazine of claim 12 further comprising:
   a handle transverse from a cartridge travel, the handle having at least one end, wherein the operator pad is longitudinally displaced from the end.

15. The cartridge magazine of claim 10, wherein a backside extends from the first wall to the second wall, wherein the backside substantially blocks movement of a cartridge through the chamber beyond the backside.

\* \* \* \* \*

UNITED STATES PATENT AND TRADEMARK OFFICE
CERTIFICATE OF CORRECTION

PATENT NO. : 7,580,220 B1  Page 1 of 1
APPLICATION NO. : 11/183620
DATED : August 25, 2009
INVENTOR(S) : Grow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 918 days.

Signed and Sealed this

Fourteenth Day of September, 2010

David J. Kappos
*Director of the United States Patent and Trademark Office*